(12) United States Patent
Wada et al.

(10) Patent No.: US 7,043,120 B2
(45) Date of Patent: May 9, 2006

(54) ARRAY WAVEGUIDE GRATING

(75) Inventors: Kazumi Wada, Lexongton, MA (US);
Hermann A. Haus, Lexington, MA (US); Lionel C. Kimerling, Concord, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 3 days.

(21) Appl. No.: 10/285,865

(22) Filed: Nov. 1, 2002

(65) Prior Publication Data
US 2003/0128927 A1 Jul. 10, 2003

Related U.S. Application Data

(60) Provisional application No. 60/343,346, filed on Dec. 21, 2001, provisional application No. 60/331,146, filed on Nov. 1, 2001.

(51) Int. Cl.
*G02B 6/34* (2006.01)
(52) U.S. Cl. .................................. 385/37; 385/31
(58) Field of Classification Search ............ 385/37, 385/24, 31, 39, 14
See application file for complete search history.

(56) References Cited

U.S. PATENT DOCUMENTS

| | | | |
|---|---|---|---|
| 5,862,279 A | 1/1999 | Amersfoort et al. | |
| 6,069,990 A * | 5/2000 | Okawa et al. | 385/43 |
| 6,289,147 B1 * | 9/2001 | Bulthuis et al. | 385/24 |
| 6,421,481 B1 * | 7/2002 | Sappey | 385/37 |
| 6,512,864 B1 * | 1/2003 | Lin et al. | 385/24 |
| 6,529,649 B1 * | 3/2003 | Soole | 385/14 |
| 6,539,150 B1 * | 3/2003 | van Weerden et al. | 385/39 |
| 6,549,696 B1 * | 4/2003 | Uetsuka et al. | 385/24 |
| 6,571,038 B1 * | 5/2003 | Joyner et al. | 385/40 |
| 6,587,615 B1 * | 7/2003 | Paiam | 385/24 |
| 6,643,419 B1 * | 11/2003 | Chang et al. | 385/14 |
| 6,701,090 B1 * | 3/2004 | Hatayama et al. | 398/79 |
| 6,768,842 B1 * | 7/2004 | Bulthuis et al. | 385/37 |
| 6,807,349 B1 * | 10/2004 | Bazylenko | 385/127 |
| 6,839,491 B1 * | 1/2005 | Painter et al. | 385/50 |

(Continued)

OTHER PUBLICATIONS

"Design of Phased-Array Wavelength Division Multiplexers Using Multimode Interference Couplers," Paiam et al. *Applied Optics*. Jul. 1997. vol. 36, No. 21.

(Continued)

*Primary Examiner*—Karl D. Frech
*Assistant Examiner*—Edwyn Labaze
(74) *Attorney, Agent, or Firm*—Gauthier & Connors, LLP

(57) ABSTRACT

An array waveguide grating structure includes an input MMI that receives an input optical signal and splits the optical signal into a plurality of signals, each having a defined wavelength. A plurality of input arrayed waveguide structures receive the plurality of signals such that each of the waveguide structures receives one of the plurality of signals. The input MMI, the plurality of arrayed waveguide structures, and the output waveguide are configured using HIC optics.

24 Claims, 4 Drawing Sheets

U.S. PATENT DOCUMENTS

| | | | |
|---|---|---|---|
| 6,856,733 B1* | 2/2005 | Zheng | 385/39 |
| 6,888,985 B1* | 5/2005 | Hosoi | 385/37 |
| 2002/0141704 A1* | 10/2002 | Lim et al. | 385/44 |
| 2002/0164118 A1* | 11/2002 | Paddon et al. | 385/31 |
| 2003/0099425 A1* | 5/2003 | Grubb et al. | 385/14 |
| 2004/0076394 A1* | 4/2004 | Carniel et al. | 385/129 |

OTHER PUBLICATIONS

"A 12-Channel Phased-Array Wavelength Multiplexer with Multimode Interference Couplers," Paiam et al. *IEEE Photonics Letters*. Feb. 1998. vol. 10, No. 2.

"Study on MMI Arrayed-Waveguide Grating MUX/DMUX," Hui-Lian et al. *Chinese Journal of Semiconductors*. Aug. 1991. vol. 22, No. 7.

"Large Single-Mode Rib Waveguides in GeSi-Si and Si-on-SiO$_2$," Soref et al. *IEEE Journal of Quantum Electronics*. Aug. 1991. vol. 27, No. 8.

"High-Density Integrated Optics," Manolatou et al. *Journal of Lightwave Technology*. Sep. 1999. vol. 17, No. 9.

"Small Radius Bends and Large Angle Splitters in SOI Waveguides," Foresi et al. *Proceedings of the SPIE*. Feb. 1997. vol. 3007.

* cited by examiner

|  | diffraction angle θ | focal length f (μm) | Per channel path difference ΔL (μm) | diffraction order m |
|---|---|---|---|---|
| Si 4 channel | 1.6° | 35 | 4.4 | 10 |
| Si 40 channel | 0.5° | 116 | 13 | 30 |
| Si₃N₄ 4 channel | 1.4° | 80 | 7.7 | 10 |
| Si₃N₄ 40 channel | 0.4° | 266 | 23 | 30 |

FIG. 3

ARRAY WAVEGUIDE GRATING

PRIORITY INFORMATION

This application claims priority from provisional applications Ser. Nos. 60/331,146 filed Nov. 1, 2001 and 60/343,346 filed Dec. 21, 2001.

BACKGROUND OF THE INVENTION

The invention relates to the field of array waveguide grating, and in particular a high-index-contrast array waveguide grating photonic integrated circuit.

Rapid growth of high-speed, broadband communication has led to a need to increase the capacity of optical communication networks. Wavelength division multiplexing (WDM) systems have key roles in meeting this need. Such networks require a variety of optical components to enable them to directly process light signals. Planar lightwave circuits (PLCs) fabricated using $SiO_2$-based waveguides are employed in various devices. Of the various types of PLCs, arrayed waveguide gratings (AWGs) are superior to other types of wavelength multiplexers/demultiplexers (MUX/DEMUX), such as dielectric multiplayer filters and fiber Bragg gratings in terms of compactness and large channel number. Thus, 16 to 64 channel AWGs have already been marketed and are widely used as MUX/DEMUX in WDM systems employed in communication networks.

Despite the advantages of AWGs, there are three other fundamental limits on today's AWGs. The first limit is the large footprint. PLCs employ $SiO_2$ materials technologies developed for optical fibers, whose index contrast is less than 1%, referred to as a low-index contrast (LIC) system. The index contrast is defined as $(n_{core}-n_{cladding})/n_{cor}$. While the LIC platform provides a low-loss technology, it necessitates large waveguide bends, typically approximately 1 cm, due to the weak confinement of light. Current AWGs require footprints of about 10×10 cm$^2$.

The second limit is hybrid integration with other optical devices. In order to achieve WDM systems, there is a need to use various devices, such as interleavers, photodetectors, and electronic circuitry. Current integration methods are necessarily hybrid due to the large footprints and thick structures, leading to low production yields and high cost.

The third limit is its thermal instability. Since the bending radii in LIC AWGs are large, the arrayed waveguides are extremely long, typically leading to shifts in the center channel wavelengths. Current $SiO_2$-based AWGs show length changes of 0.011 nm/° C. Thus, thermal controller footprints similar to those of the AWGs are necessary to keep the AWG performances constant.

SUMMARY OF THE INVENTION

According to one aspect of the invention, there is provided an array waveguide grating structure. The array waveguide grating structure includes an input multi-mode interferometer (MMI) that receives an input optical signal and splits the optical signal into a plurality of signals, each having a defined wavelength. A plurality of input arrayed waveguide structures receives the plurality of signals such that each of the waveguide structures receives one of the plurality of signals. The input MMI, the plurality of arrayed waveguide structures, and the output waveguide are configured using high index contrast (HIC) or high transmission cavity (HTC) optics.

According to another aspect of the invention, there is provided a method of forming an array waveguide grating structure. The method includes providing an input MMI that receives an input optical signal and splits the optical signal into a plurality of signals, each having a defined wavelength. The method also includes providing a plurality of input arrayed waveguide structures receiving the plurality of signals such that each of the waveguide structures receives one of the plurality of signals. Furthermore, the method includes providing an output MMI receiving the plurality of signals from the plurality input of arrayed structures so that the plurality of signals are maintained in accordance with each of the wavelength as defined for the plurality of signals by the input MMI. The input MMI, the plurality of arrayed waveguide structures, and the output waveguide are configured using HIC or HTC optics.

BRIEF DESCRIPTION OF THE DRAWINGS

FIG. 3 is a table of the size and channel number of HIC AWGs.

DETAILED DESCRIPTION OF THE INVENTION

High index contrast (HIC) structures are a new platform from which to make optical components within a small die area. Typical high index materials include Si and $Si_3N_4$, with indices 3.5 and approximately 2.2, respectively. The index contrasts with $SiO_2$ cladding layers are approximately 60 and 40%, respectively.

The HIC system strongly confines light in the cores, allowing sharp bends, and therefore, small footprints. Having small footprints also enhance the thermal stability because of the negligible expansion of the waveguides. Si and $Si_3N_4$ materials are Si IC process compatible. However, sidewall roughness is a crucial factor for low-loss waveguides. Based on the theory to predict the effects of sidewall roughness on light scattering, Si is more sensitive to roughness than is $Si_3N_4$ or Si(O)N. However, Si has facet planes, which are atomically flat and can be controlled by post-process annealing. In this way, the sidewall roughness can be controllable.

For analog signal processing, the crosstalk between adjacent channels should be as small as approximately 40 dB. Interleaver filters can be used to achieve such a low crosstalk. Generic interleavers in $SiO_2$-based PLCs will consist of a set of 3 dB directional couplers/splitters to divide a signal group with a wavelength spacing of Δλ into two (odd and even) channels with a wavelength spacing of 2Δλ, thereby reducing the adjacent channel crosstalk. Use of the AWGs in digital applications does not require such a low crosstalk.

Thermal stability depends on the temperature dependence of the refractive index, in addition to the linear expansion coefficient of the waveguide materials. Silicon's index has a larger temperature dependence than does $Si_3N_4$'s index.

Figure 1:
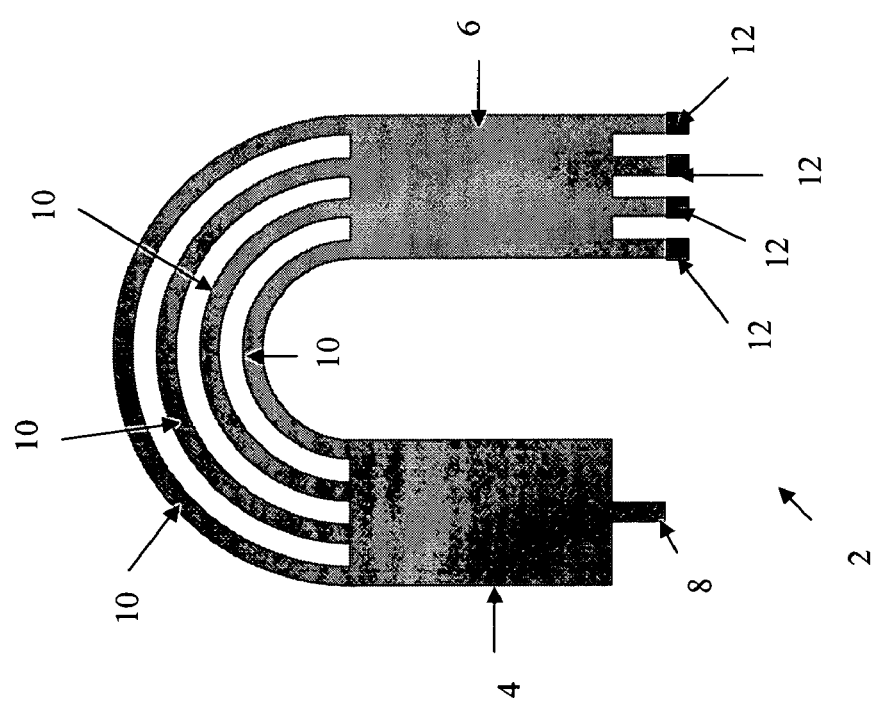
FIG. 1 is a schematic diagram of a HIC AWG.

FIG. 1 is a schematic diagram of an exemplary HIC AWG 2 in accordance with the invention. The design of the structure and development of the compact HIC AWG can be fabricated on a high-speed, complementary-bipolar, trench-etched-on-sidewall-oxide-isolated SOI, wafer fabrication process to achieve chip-scale, wavelength-division multiplexing (CS-WDM). The size and functions of the HIC AWG is analyzed using grating equations.

The AWG 2 includes an input MMI 4, input arrayed waveguides 10, an output MMI 6, and output arrayed waveguides 12. The input MMI 4 receives an optical signal from an input waveguide 8, and proceeds to split the signal into 4 channels in the C-band. In other embodiments, the input MMI 4 can split an optical into more than 4 channels, for example, 32 or 40 channels. Each of the signals has a different wavelength or frequency in the C-band. The dimensions of the input MMI 4 define the range of optical splitting that can be performed. Furthermore, the input MMI 4 is formed using HIC optics, which is used for producing optical elements with small die areas.

The input MMI 4 provides its outputs to the 4 distinct input arrayed waveguides 10. The input arrayed waveguides 10 are a medium for transmitting the 4 C-band signals to the output MMI 8. Also, the input arrayed waveguides 10 are designed to have a specified bend in their orientation so that they can be used without taking much space. Each of the input arrayed waveguides 10 is spaced apart in wavelengths of a defined amount. In this embodiment, the wavelength spacing is approximately 10 nm. In another embodiment, the input arrayed waveguides 10 can have a linear arrangement. Note that the input arrayed waveguides 10 are formed using HIC optics, however, the input arrayed waveguides 10 can also be formed using high transmission cavity (HTC) optics.

The input arrayed waveguides 10 provide their respective signals to the output MMI 8. The respective signal received to the output MMI are in different C-bands, as formed by the input MMI 4. The output MMI 8 maintains the exact C-bands that was formed by the input MMI 4. In particular, the output MMI 8 filters the noise that is incorporated by having the C-band signals travel in the input arrayed waveguides, and can be used to further split the various C-band signals into finer optical signals.

As discussed previously regarding the input MMI 4, the dimensions of the output MMI 6 define the range of optical splitting that can be performed. However, the output MMI 6 is formed using HIC optics, which is used for producing optical elements with small die areas. Furthermore, the output MMI 6 outputs each of its signals to the four output arrayed waveguides 12. In this embodiment, the input and output MMIs 4 and 6 are both the same device, however, in other embodiments, they can be different.

The output arrayed waveguides 12 provide their respective signals as input to an associated optical element for further processing. Note that the output arrayed waveguides 12 are formed using HIC optics.

Theoretical analyses have been made to predict the size and functionality of generic AWG structures on the HIC platform shown in FIG. 1. Four channels are assumed for the WDM integration, but the scalability to 32 channels is examined. Both digital and analog applications in the C-band are considered. Interleaver filters are necessary for analog applications, where crosstalk with the adjacent waveguide of −40 dB is assumed. The thermal stability of the performance is checked between 0 to 70° C. The analyses have demonstrated that the AWGS with typical size approximately 100×100 µm² should be achievable using high-index contrast optics based on Si or $Si_3N_4$ core layers with $SiO_2$ cladding layers.

The following set of grating equations are used to evaluate the fundamental size minimization limits:

$$m \cdot \lambda = n_s \cdot d \cdot \sin \theta + n_c \cdot \Delta L \qquad \text{Eq. 1}$$

$$\frac{dx}{d\lambda} = \frac{f \cdot m}{n_s \cdot d} \quad m = \frac{n_c \cdot \Delta L}{\lambda_0} \quad FSR \approx \frac{\lambda}{m} \qquad \text{Eq. 2}$$

where m is the diffraction order, λ is the wavelength of diffracted light, d is the pitch of the arrayed waveguides, θ is the diffraction angle, ΔL is the path difference in the arrayed waveguides, $n_s$ is the refractive index of the MMI, $n_c$ is the refractive index in the arrayed waveguides, f is the focal length of output MMI, and $\lambda_0$ is center wavelength.

The unknown parameters are the focal length and the diffractions order. Since there is no restriction on the length of the arrayed waveguide in the equations, the AWG size is essentially limited by the curvature of the arrayed waveguides and the size of the input and output MMIs. Here it is assumed that the input MMI has the same geometry as the output MMI.

Figure 2:
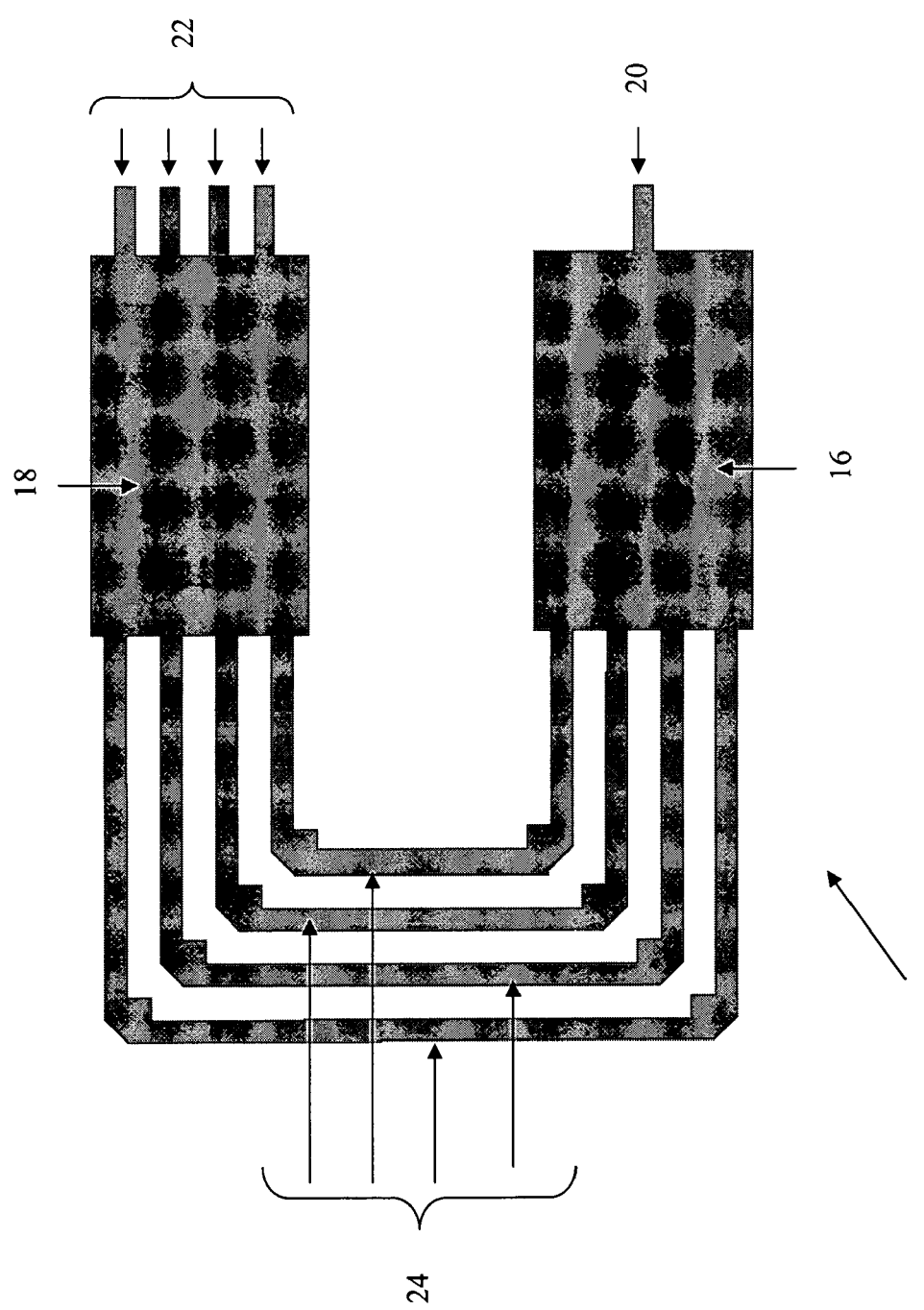
FIG. 2 is schematic diagram of a HTC AWG.

FIG. 2 is a schematic diagram of an exemplary high transmission cavity (HTC) AWG 14 in accordance with the invention. Standard HTC structures provide for right angle bends with at least 98% transmittance. The design of the structure and development of the compact HTC AWG can be fabricated on a high-speed, complementary-bipolar, trench-etched-on-sidewall-oxide-isolated SOI, wafer fabrication process to achieve chip-scale, wavelength-division multiplexing (CS-WDM). The size and functions of the HTC AWG is analyzed using previously described grating equations Eq. 1 and Eq. 2.

The AWG 14 includes an input MMI 16, input arrayed waveguides 24, an output MMI 18, and output arrayed waveguides 22. The input MMI 16 receives an optical signal from an input waveguide 20, and proceeds to split the signal into 4 channels in the C-band. In other embodiments, the input MMI 16 can split an optical into more than 4 channels, for example, 32 or 40 channels. Each of the signals has a different wavelength or frequency in the C-band. The dimensions of the input MMI 16 define the range of optical splitting that can be performed. Furthermore, the input MMI 16 is formed using HTC optics, which is used for producing compact optical elements.

The input MMI 16 provides its outputs to the 4 distinct input arrayed waveguides 24. The input arrayed waveguides 24 are a medium for transmitting the 4 C-band signals to the output MMI 18. Also, the input arrayed waveguides 24 are designed to have a 90-degree bend in their orientation so that they can be used without taking much space. Each of the input arrayed waveguides 24 is spaced apart a defined amount. In this embodiment, the spacing is approximately 10 nm. In another embodiment, the input arrayed waveguides 24 can have a linear arrangement.

The input arrayed waveguides 24 provide their respective signals to the output MMI 18. The respective signal received to the output MMI 18 are in different C-bands, as formed by the input MMI 4. The output MMI 18 maintains the exact C-bands that was formed by the input MMI 16. In particular, the output MMI 18 filters the noise that is incorporated by having the C-band signals travel in the input arrayed waveguides, and can be used to further split the various C-band signals into finer optical signals.

As discussed previously regarding the input MMI 16, the dimensions of the output MMI 18 define the range of optical splitting that can be performed. However, the output MMI 18 is formed using HTC optics, which is used for producing compact optical elements. Furthermore, the output MMI 18 outputs each of its signals to the four output arrayed waveguides 22. In this embodiment, the input and output MMIs 16 and 18 are both the same device, however, in other embodiments, they can be different.

The output arrayed waveguides 22 provide their respective signals as input to an associated optical element for further processing, and they are formed using HTC optics.

FIG. 3 is a table of the size and channel number of HIC AWGs. It is assumed that the footprint and the performance of two typical HIC AWGs where the channel spacing is 10 nm. The spacing corresponds to 4 channels in the C-band. Since the minimum curvatures of the Si and $Si_3N_4$ waveguide bends are 1 and 10 µm respectively, the bending radii are no longer factors that prevent the device shrinkage. This is a significant advantage over HIC AWGs. The diffraction order, m, should be smaller than 40 because of the C-band width approximately 40 nm.

The dimensions for the 10 nm spacing are summarized in FIG. 2. For Si, the diffraction angle is 1.6°, focal length f is 3.5 µm, and $\Delta L$ is 7.7 µm when m is 10. It is clear that the footprints of the 4-channel HIC AWG are less than 100×100 µm². The parameters for the case of a 1 nm channel spacing, for example 40-channel AWGs, are also summarized in FIG. 2. Here, the focal length is a decisive parameter for the shrinkage.

The size of the MMIs should be characterized by the product of the focal length and the number of channels ($n_{ch}$) times the channel pitch. Based on the analyses discussed previously, the size of the Si MMIs is estimated to be 35×4 µm² for 4 channels and 116×4 µm² for 40 channels.

The arrayed waveguide part depends on L as well as $\Delta L$. Here it is assumed L is equal to $\Delta L$. Then the longest waveguide in the arrayed waveguide part is the outer waveguide, whose length is $L+n_{ch}\Delta L$. In other words, in Si it is approximately 18 µm for a 4-channel AWG and approximately 500 µm for a 40-channel AWG. In $Si_3N_4$, it is approximately 40 µm for a 4-channel AWG and approximately 900 µm for a 40-channel AWG. Therefore, scalability to a 32-channel AWG can be achieved.

The candidate materials in this invention can be Si, $Si_3N_4$, and Si(O)N. FIG. 2 shows the potential of Si and $Si_3N_4$. Silicon oxynitride (Si(O)N) is a general term for alloys of $SiO_2$ and $Si_3N_4$. The refractive index is controllable in the range between 1.46 and 2.0, which is impossible for the Ge-doped $SiO_2$ system currently being used in LIC PLCs. The index can be chosen to be 1.56, and thus the index difference from $SiO_2$ is 0.1.

The minimum-bending radius for a silicon oxynitride core with $SiO_2$ claddings can be 100 µm. When the channel spacing is 10 nm, the focal length should be 2000 µm and the $\Delta L$ is 30 µm.

Figure 4:
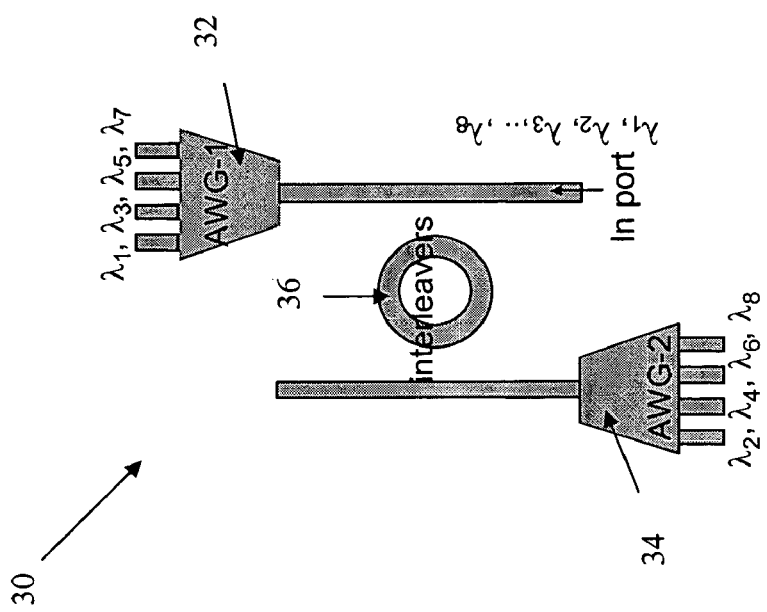
FIG. 4 is a schematic diagram of an exemplary interleaver in accordance with the invention.

FIG. 4 is a schematic diagram of an exemplary interleaver 30 using AWGs 32, 34 of the invention used in crosstalk. In order to realize denser CS-WDM, the increase in the diffraction order should decrease the focal length, while it should increase the path difference. As previously discussed, the compact 32-channel HIC AWGs are best achieved in the Si materials system. $Si_3N_4$ systems are also applicable for HIC AWGs, although the size is a little larger than that on the Si systems.

Crosstalk with adjacent waveguides will be −15 dB, which is low enough for digital applications using the inventive AWGs. As for analog applications, extremely low crosstalk of −40 dB is required to obtain wide dynamic range. In order to realize such a low crosstalk, the invention uses interleaver filters. The AWGs shown in FIG. 3 are designed according to the task previously described.

The interleaver 30 includes micro-ring resonators 36 to divide a signal group with wavelength spacing of free spectral range into to odd and even output channels with doubled channel spacing. Two AWGs 32, 34 are connected to these even and odd channels of the interleaver filters. Using this device can significantly reduce crosstalk down to −40 dB. In this embodiment, the ring resonator 36 with 4 multiple rings is used to verify that the filter characteristics fit the desired requirements. As the bending radius is not a decisive factor, the interleaver could also be as small as an order of wavelength in size. Monolithic integration of the interleaver with two AWGs should be achieved since these components are on the same materials systems, processed by the same Si IC processing, and the footprints are extremely small.

Insertion losses in generic AWGs are generally small among various MUX/DEMUX, such as dielectric mirror filters and fiber Bragg gratings because there are no abrupt changes of refractive index in device geometry. However, insertion loss could be more serious in the HIC-AWG systems. The causes of insertion loss are classified as return loss at junctions between MMI exits and outgoing waveguides, propagation loss in the waveguides and MMIs, bending loss of waveguides, and fiber-to-waveguide coupling loss. The bending loss of waveguides can be compensated for in the HIC-AWG systems so that the dominant factors of the insertion loss are return loss, propagation loss, and fiber coupling loss.

Return loss is defined as scattering loss at the junction from MMI exits and waveguides. In other words, there are two junctions: the input MMI to arrayed waveguides and the output MMI to outgoing waveguide channels. Since the widths of single-mode waveguides are typically as small 0.5 µm wide and 0.2 µm thick and the distance between two channels spacing is 1 µm, mode matching at these junctions is one of the most important requirements in minimizing the total insertion loss of the HIC AWGs. The strategy for minimizing the return loss if it is severe is to use graded effective index at the junction. This should minimize the reflection at these junctions.

Light scattering in terms of the waveguide surface roughness induces the propagation loss in the waveguides and MMIs. The top and bottom interfaces of the waveguide core with the cladding is essentially smooth since these interfaces are obtained by deposition or as SOI structures. However, the sidewalls are fabricated by lithography and etching processing, so the roughness is strongly dependent on the evolution of lithographic and etch technology. It is predicted that the propagation loss depends on the amplitude and the periodicity of the roughness. There is a loss peak in the roughness period. This period corresponds to a quarter-lambda wavelength in the waveguides.

By minimizing surface roughness, it could reduce the propagation loss. For example, atomically flat sidewalls aligned to {110} can make the propagation loss negligible because the planes are crystallographic facets. Si waveguides have an advantage, since they are single crystal. The AWGs with high transmission cavity (HTC) could suppress the propagation loss via facets, since the HTC structures are mostly surrounded with linear sidewalls that could be facets.

A temperature change between 0 and 70° C. will lead to a shift in the center wavelength $\mu_o$ through temperature-induced length and refractive index change in the AWG. The sensitivity of the center wavelength to ambient temperature fluctuations is defined as $$\frac{d\lambda_0}{dT} = \frac{\lambda_0}{n_c}\frac{\partial n_c}{\partial T} + \frac{\lambda_0}{\Delta L}\frac{\partial \Delta L}{\partial T} \qquad \text{Eq. 3}$$

The temperature dependence of the linear expansion coefficient of Si $\Delta L/L$ is reported to be $2.6 \times 10^{-6}$ °C.$^{-1}$ and the relative index n is $3.38 \times (1 + 3.9 \times 10^{-5}\,T)$. On the other hand, the temperature dependences for $Si_3N_4$ are $2.8 \times 10^{-6}$ °C.$^{-1}$ and the relative index n is $2.0 \times (1 + 2 \times 10^{-6}\,T)$, respectively. The shift of the center wavelength is calculated to be 0.004 nm/° C. Although strain induced by the temperature fluctuation is not taken into account, there is no need for thermal stabilization of 4-channel AWGs. To scale to 32 channels, $Si_3N_4$ based on AWGs should be advantageous over Si but both should work with a moderate thermal controller.

Although the present invention has been shown and described with respect to several preferred embodiments thereof, various changes, omissions and additions to the form and detail thereof, may be made therein, without departing from the spirit and scope of the invention.

What is claimed is:

1. An array waveguide grating comprising:
   an input MMI that receives an input optical signal and splits said optical signal into a plurality of signals, each having a defined wavelength;
   a plurality of input arrayed waveguide structures receiving said plurality of signals such that each of said waveguide structures receives one of the plurality of signal and each are spaced approximately between 1 nm and 10 nm apart; and
   an output MMI that receives said plurality of signals from said plurality input of arrayed structures so that the plurality of signals are maintained in accordance with each of said wavelengths as defined for said plurality of signals by said input MMI,
   wherein said input MMI, said plurality of arrayed waveguide structures, and said output waveguide are configured using HIC or HTC optics and said array waveguide grating comprises a footprint of at most $100 \times 100$ μm$^2$.

2. The array waveguide grating of claim 1 further comprising a plurality of output waveguide structures receiving signals outputted by said output MMI.

3. The array waveguide grating of claim 2, wherein said plurality of output waveguide structures are configured using HIC optics.

4. The array waveguide grating of claim 2, wherein said output arrayed waveguides are configured using HTC optics.

5. The array waveguide grating of claim 1 further comprising an input waveguide coupled to said input MMI for providing said input optical signal.

6. The array waveguide grating of claim 5, said input arrayed waveguides are configured using HTC optics.

7. The array waveguide grating of claim 1, wherein said input array waveguide structures are associated with channels in a C-band.

8. The array waveguide grating of claim 7, wherein said input array waveguide structures output 4 channels in said C-band.

9. The array waveguide grating of claim 8, wherein said input MMI and said output MMI are the same device.

10. The array waveguide grating of claim of claim 7, wherein said input array waveguide structures output 32 channels in said C-band.

11. The array waveguide grating of claim 7, wherein said input array waveguide structures output 40 channels in said C-band.

12. The array waveguide grating of claim 7, wherein said input MMI is characterized by the product of the focal length of the output MMI and number of channels times the channel pitch.

13. A method of forming an array waveguide grating comprising:
   providing an input MMI that receives an input optical signal and splits said optical signal into a plurality of signals, each having a defined wavelength;
   providing a plurality of input arrayed waveguide structures receiving said plurality of signal such that each of said waveguide structures receives one of the plurality of signals and each are spaced approximately between 1 nm and 10 nm apart; and
   providing an output MMI receiving said plurality of signals from said plurality input of arrayed structures so that the plurality of signals are maintained in accordance with each of said wavelengths as defined for said plurality of signals by said input MMI,
   wherein said input MMI, plurality of arrayed waveguide structures, and said output waveguide are configured using HIC or HTC optics and said array waveguide grating comprises a footprint of at most $100 \times 100$ μm$^2$.

14. The method of claim 13 further comprising providing a plurality of output waveguide structures receiving signals outputted by said output MMI.

15. The method of claim 14, wherein said plurality of output waveguide structures are configured using HIC optics.

16. The array waveguide grating of claim 14, wherein said output waveguide structures are configured using HTC optics.

17. The method of claim 13 further comprising providing an input waveguide coupled to said input MMI for providing said input optical signal.

18. The array waveguide grating of claim 17, said input waveguide structures are configured using HTC optics.

19. The method of claim 13, wherein said input array waveguide structures are associated with channels in a C-band.

20. The method of claim 19, wherein said input array waveguide structures output 4 channels in said C-band.

21. The method of claim 20, wherein said input MMI and said output MMI are the same device.

22. The method of claim 19, wherein said input array waveguide structures output 32 channels in said C-band.

23. The method of claim 19, wherein said input array waveguide structures output 40 channels in said C-band.

24. The method of claim 19, wherein said input MMI is characterized by the product of the focal length of the output MMI and number of channels times the channel pitch.

* * * * *